United States Patent [19]
Schalles et al.

[11] 3,990,133
[45] Nov. 9, 1976

[54] MULTI-STATION MACHINE TOOL WITH PAIRS OF TOOL-AND WORK-SPINDLES

[75] Inventors: Erhard Schalles, Ubbedissen; Werner Latten, Oerlinghausen, both of Germany

[73] Assignee: Gildemeister Aktiengesellschaft, Bielefeld, Germany

[22] Filed: Jan. 14, 1975

[21] Appl. No.: 540,945

[30] Foreign Application Priority Data
Jan. 15, 1974  Germany............................ 2401656

[52] U.S. Cl. .............................. 29/27 C; 29/38 B; 29/38 C; 82/2.5; 82/3; 408/33
[51] Int. Cl.² .......................................... B23B 9/00
[58] Field of Search ................ 29/27 C, 35.5, 38 B, 29/38 C; 408/71, 32, 33; 82/38, 2.5, 3

[56] References Cited
UNITED STATES PATENTS

| | | | |
|---|---|---|---|
| 1,298,967 | 4/1919 | Kramer............................... | 29/38 C |
| 1,912,339 | 5/1933 | Mathias............................. | 408/71 X |
| 1,918,538 | 7/1933 | Hallenbeck...................... | 29/38 C X |
| 2,337,528 | 12/1943 | Stuckert et al.................. | 29/38 C X |
| 2,364,884 | 12/1944 | Weimer............................. | 29/38 B X |
| 2,812,694 | 11/1957 | Beichard et al................. | 90/13.1 |
| 2,875,650 | 3/1959 | Hazlinger......................... | 408/33 |
| 3,103,840 | 9/1963 | Beacom et al................... | 82/38 |

Primary Examiner—Othell M. Simpson
Assistant Examiner—Fred A. Silverberg
Attorney, Agent, or Firm—Michael J. Striker

[57] ABSTRACT

A multi-station machine tool wherein the bed of the frame supports two spaced-apart upright columns and the columns support an indexible shaft for a turret which is disposed between the columns. The turret has several sets of clamping jaws for elongated rod-shaped workpieces which are introduced and removed at a first station or which are introduced at a first station and removed at a second station. The number of stations may greatly exceed two, and each column supports several spindles including at least one rotary and axially movable tool spindle and at least one axially movable and preferably rotary work spindle. Each spindle in one of the carriers is coaxial with a spindle in the other carrier, and the turret indexes the workpieces in such a way that they come to rest between successive or selected pairs of coaxial spindles. The tool spindles carry holders for tools which can treat the end faces of workpieces while the workpieces are held by the respective jaws, and the work spindles include centers and means for rotating the workpieces (while the workpieces are temporarily released by the respective jaws) so that the rotating workpieces can be treated by tools which are mounted in slides movable lengthwise and/or transversely of ways provided on the bed and/or on a crosshead which connects the upper end portions of the columns.

14 Claims, 9 Drawing Figures

3,990,133

MULTI-STATION MACHINE TOOL WITH PAIRS OF TOOL- AND WORK-SPINDLES

BACKGROUND OF THE INVENTION

The present invention relates to multi-station machine tools in general, and more particularly to improvements in multi-station machine tools which comprise several pairs of spindles. Still more particularly, the invention relates to improvements in machine tools of the type wherein the spindles are disposed at the opposite sides of an indexible work supporting device.

It is already known to provide the frame of a machine tool with two spaced-apart carriers for rotary spindles which mount holders for suitable tools. The work supporting device is a turret which is indexible in the space between the carriers. The spindles cannot move axially in the respective carriers but the carriers are movable relative to the bed of the machine frame. A drawback of the just described machine tools is that they are suitable only for treatment of relatively short workpieces and that the tools can treat the workpieces only at their end faces or from within. Such machine tools cannot be used for the treatment of peripheral surfaces of relatively long workpieces in the form of shafts, rods or the like.

It is also known to treat relatively long workpieces in a machine tool wherein the workpieces are engaged by pairs of centers and the machine tool further comprises means which transmits torque to one end portion of a workpiece which is held between two centers. When a workpiece reaches a treating station, it is supported by a steady rest. The transfer of workpieces from station to station is effected by indexing a carrier for the centers. Reference may be had to German Pat. No. 1,271,501. The steady rests are indexed with the carrier. A drawback of such machine tools is that each workpiece must be centered prior to introduction into the first station in order to insure that the workpiece can be properly engaged by two aligned centers. Moreover, and since the workpieces are held between centers, their end faces cannot be subjected to any treatment. The peripheral surfaces of workpieces which are held by pairs of centers are treated by tools which are mounted on cross slides. This reduces the versatility of the machine tool and necessitates a separate treatment of end faces in a further machine.

It is further known to treat elongated rod-shaped or analogous workpieces in a series of machine tools which together form a production line. Each machine tool subjects the workpiece to a single treatment so that, if the number of necessary treatments is relatively high, the production line must consist of a large number of discrete machines which occupy much floor space and contribute significantly to the cost of finished workpieces. Moreover, a production line must be provided with several automatic (and hence complex and expensive) transfer apparatus which convey workpieces from machine tool to machine tool.

SUMMARY OF THE INVENTION

An object of the invention is to provide a compact and simple but highly versatile machine tool wherein relatively short or relatively long workpieces can be subjected to a large number of widely different treatments including the machining of their peripheral surfaces and/or end faces.

Another object of the invention is to provide a machine tool which is especially suited for treatment of shafts, rods or analogous elongated metallic workpieces and wherein the number and/or nature of treatments to which the end faces and/or peripheral surfaces or workpieces are to be subjected can be varied practically at will and by necessitating relatively short-lasting interruptions in the operation of machine tool.

An additional object of the invention is to provide a multi-station machine tool wherein the treatment of one or both end faces of elongated workpieces may precede or follow the treatment of peripheral surfaces and wherein the treatment of one or both end faces and/or the treatment of peripheral surfaces of workpieces can be completed in a single stage or two or more stages.

A further object of the invention is to provide a versatile multi-station machine tool with a novel and improved arrangement of rotary spindles.

The invention is embodied in a machine tool, particularly in a multi-station machine for treatment of rotary shafts or analogous elongated workpieces. The machine tool comprises a frame including a main portion (this main portion preferably constitutes a base or bed) and spaced apart first and second spindle carriers which are supported by the main portion (the spindle carriers may constitute upright columns which are mounted on or are made integral with and extend upwardly from the base), and pairs of coaxial spindles. One spindle of each pair is mounted in the first carrier and the other spindle of each pair is mounted in the second carrier. The pairs of spindles include at least one pair of rotary tool spindles (i.e., spindles which can be provided with holders for one or more tools such as may be utilized to treat the end faces of a metallic rod, shaft or an analogous workpiece) and at least one pair of work spindles (i.e., spindles which can support a workpiece and, to this end, are provided with chucks, collets, centers and/or analogous means which can merely engage an end of a workpiece or which can engage and rotate a workpiece). The machine tool further comprises means for moving at least one spindle of each pair axially (such moving means may include fluid-operated cylinders and/or means for moving one or both carriers in parallelism with the axes of the spindles), an indexible turret or analogous work supporting means mounted in the frame intermediate the carriers and having at least one pair of jaws or other suitable work clamping means, means for indexing the supporting means so that a workpiece which is held by the clamping means is moved between the spindles of the spindle pairs along an endless path to a plurality of positions including a position between the tool spindles and a position between the work spindles, at least one guide provided in the frame and extending in parallelism with the axes of the spindles, and at least one tool slide movably mounted on the guide so that a tool in the slide can treat a workpiece which is disposed between a pair of the spindles, especially between a pair of work spindles at least one of which can rotate the workpiece while the workpiece is temporarily released by the clamping means. The guide is outwardly adjacent to the endless path for the workpieces. The indexing means may include a shaft which carries the supporting means in the space between the carriers and is journalled in one but preferably in both carriers. The machine tool preferably further comprises means for moving the aforementioned slide lengthwise and transversely of the guide; for example, the slide can be mounted on a carriage which is movable lengthwise of the guide and the carriage can support a fluid-operated motor which can move the slide transversely of the guide.

The number of aforementioned positions preferably exceeds the number of spindle pairs by at least one so that, at least in one of its positions, a workpiece can be readily removed from the clamping means on the supporting means.

The novel features which are considered as characteristic of the invention are set forth in particular in the appended claims. The improved machine tool itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
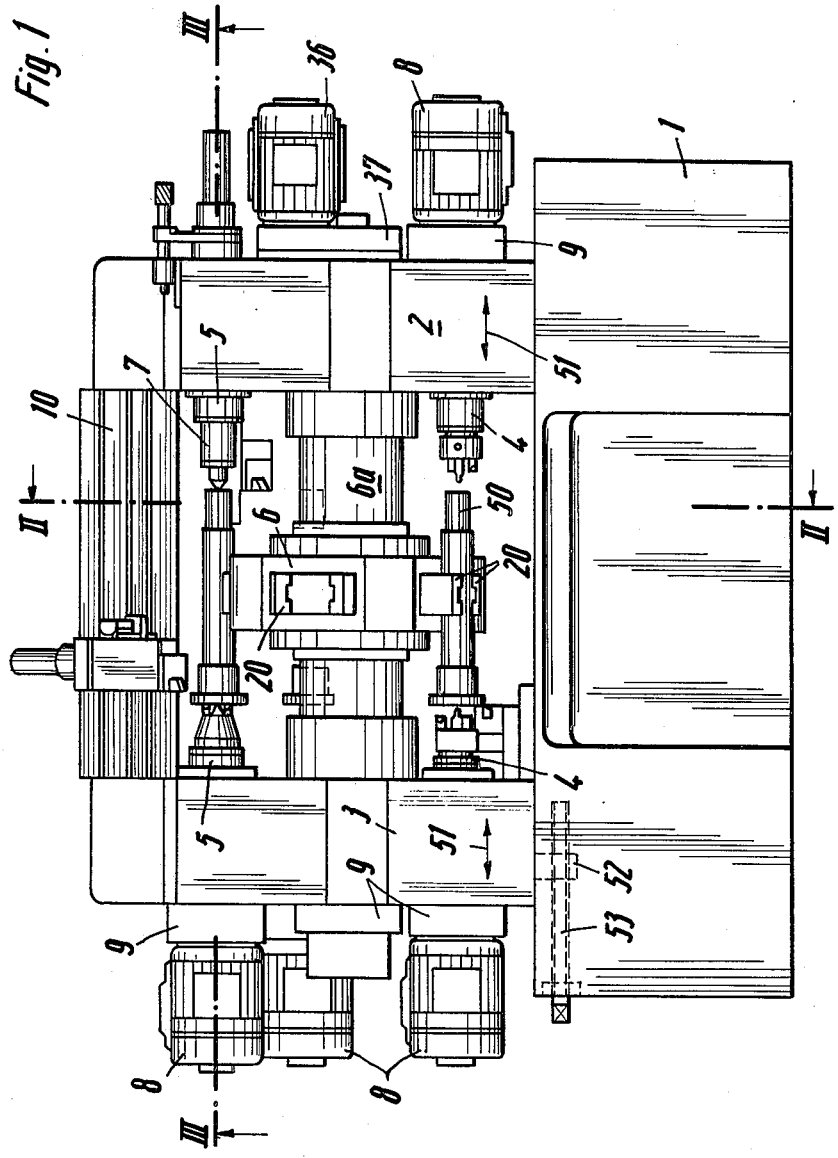
FIG. 1 is a schematic elevational view of a machine tool which embodies one form of the invention.
Figure 2:
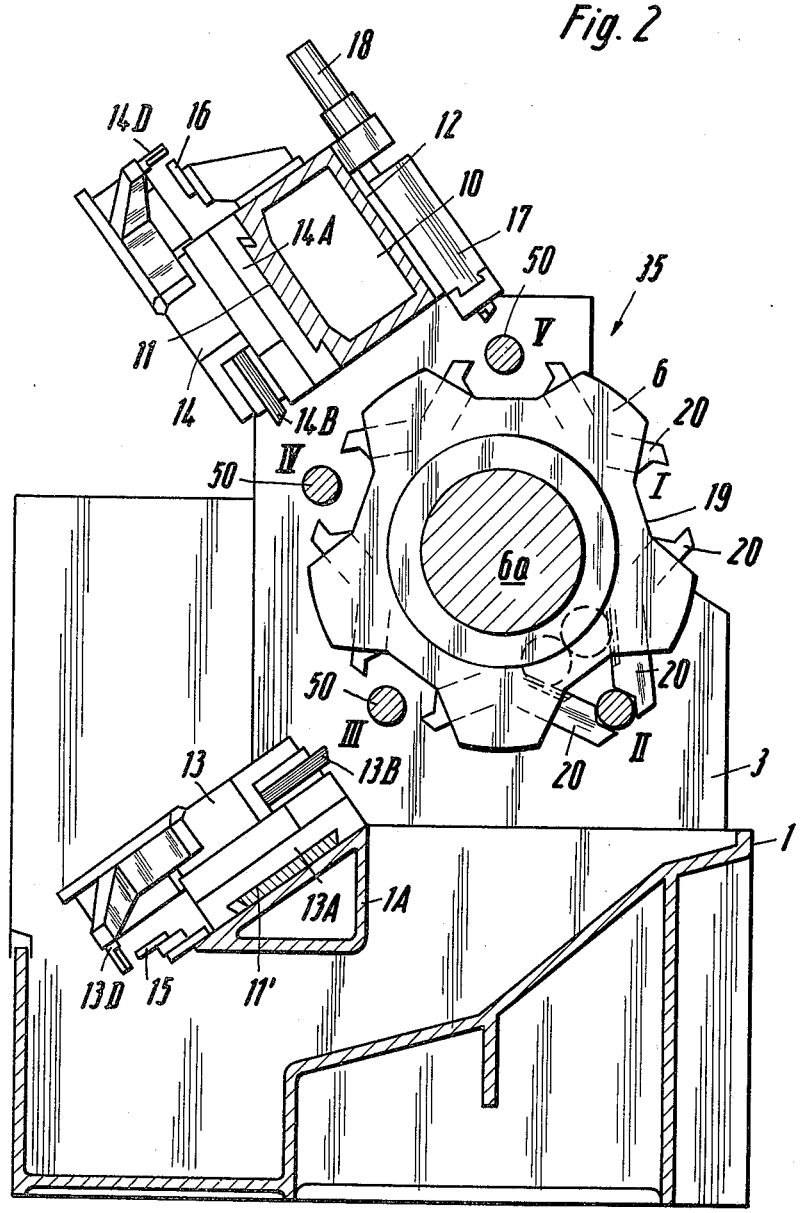
FIG. 2 is an enlarged transverse vertical sectional view substantially as seen in the direction of arrows from the line II—II of FIG. 1.

Referring first to FIG. 1, there is shown a machine tool having a frame which includes a main portion constituting a base or bed 1 and two upstanding spindle carriers or columns 2, 3 which are spaced apart from each other and extend upwardly from the bed 1. The upper end portions of the columns 2, 3 are connected to each other by a horizontal traverse or crosshead 10 of the frame. As shown in FIG. 2, the crosshead 10 is provided with or connected to elongated guide means or ways 11 and 12 which are inclined with respect to a horizontal plane and extend lengthwise of the crosshead. The median portions of the columns 2, 3 support the respective end portions of a horizontal indexing shaft 6a for a work supporting turret 6 having five pairs of equally spaced work clamping jaws 20. The turret 6 can be disposed exactly or substantially midway between the columns 2 and 3.

Each of the columns 2, 3 further supports four spindles and each spindle in the column 2 is aligned with a spindle in the column 3. The spindles include tool spindles 4 which can carry holders 4A for sets of material removing tools 30, 31 (see FIG. 4) adapted to treat the end faces of elongated workpieces 50 such as that shown in FIG. 4. While the tools 30, 31 in the holders 4A of spindles 4 (which are rotatable) remove material from the respective end faces of a workpiece 50, the latter is held by two claws 20 of the indexible turret 6. The spindles on the columns 2, 3 further include first rotary work spindles 5 which can be provided with torque-transmitting devices 29 (see FIG. 6) and second work spindles in the form of tail spindles 7 which are provided with centers 24 (see FIG. 6). The column 3 is assumed to support a single tool spindle 4, two work spindles 5 and a single tail spindle 7 (see the left-hand portions of FIGS. 5–8). The column 2 is assumed to support a single tool spindle 4 (which is aligned with the single tool spindle 4 of the column 3), a single work spindle 5 (which is aligned with the single tool spindle 7 of the column 3) and two tail spindles 7 (each of which is aligned with one of the two work spindles 5 in the column 3). However, it is equally possible to use pairs of aligned rotary work spindles 5. The spindles in at least one of the columns 2, 3 have limited freedom of axial movement in parallelism with the longitudinal direction of the crosshead 10. The pairs of aligned spindles 4, 4 and 5, 7 are located at four spaced-apart treating or working stations II, III, IV and V (see FIG. 2), and the machine tool has a further station I where fresh workpieces 50 are fed to the turret 6 and finished workpieces are removed from the turret.

Each of the spindles 4 and 5 is driven by a discrete prime mover 8 (e.g., an electric motor) through the medium of a suitable transmission 9 (e.g., a gear transmission). However, it is clear that a common prime mover can be provided for two or more spindles 4, 5, for example, a first prime mover can rotate the spindles 4, 5, 5 in the column 3 and a second prime mover can rotate the spindles 4, 5 in the column 2. Each prime mover which drives several spindles can transmit torque through the medium of gear trains, toothed belt drives, chain drives or the like.

The main portion or bed 1 of the frame is formed with elongated guide means or ways 11' for one or more carriages 13A which are movable in parallelism with the shaft 6a. At least one of the carriages 13A supports a copying tool slide 13 which is movable radially of a workpiece 50 at the treating station III (see FIG. 2) and carries one or more tools 13B. The bracket 1A for the ways 11' supports a template 15 which can be tracked by a follower 13D of the copying slide 13 to insure that the tool 13B on the slide 13 is fed against a workpiece 50 at the station III in accordance with a predetermined pattern.

The ways 11 on the crosshead 10 guide a carriage 14A for a copying tool slide 14 which can be fed radially of a workpiece 50 at the treating station IV. A tool in the slide 14 is shown at 14B and this slide has a follower 14D which can track a template 16 on the crosshead 10. A slide 17 is mounted in the ways 12 and can be moved substantially radially of a workpiece 50 at the station V by a hydraulic motor 18. The slide 17 may be mounted on a carriage which is displaceable lengthwise of the crosshead 10.

As shown in FIG. 2, the turret 6 has several equally spaced recesses 19 and each pair of clamping jaws 20 is mounted in one of the recesses 19. The jaws 20 can be actuated by mechanical, hydraulic or electrical means to be moved into and from engagement with a workpiece 50. The shaft 6a is rotatable through angles of 72 degrees by a discrete prime mover 36 (e.g., an electric motor) through the medium of a suitable step-down transmission 37, both shown in FIG. 1.

Figure 3:
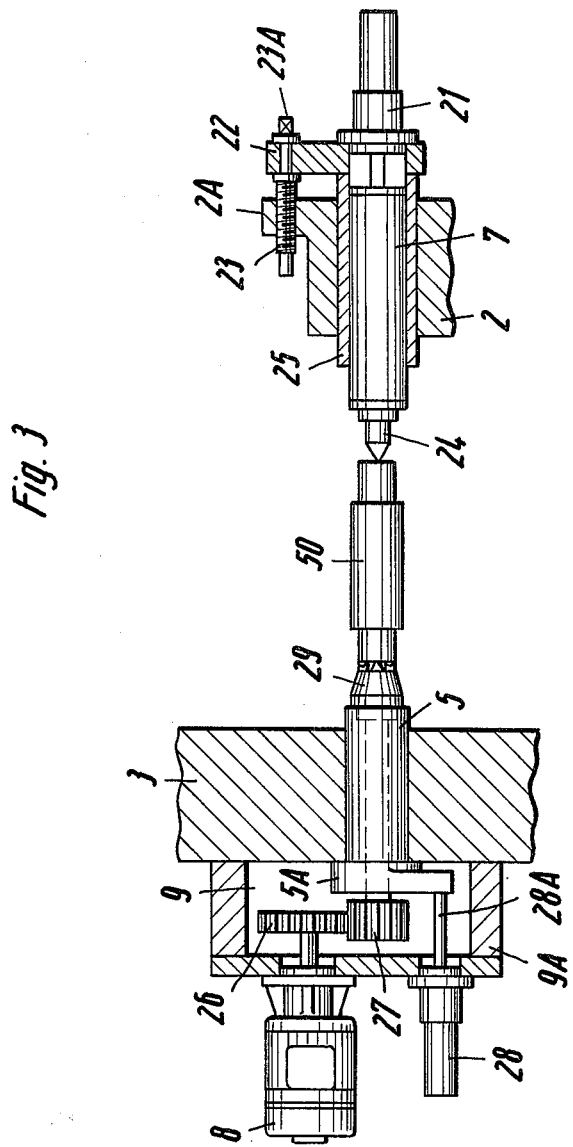
FIG. 3 is an enlarged fragmentary longitudinal sectional view as seen in the direction of arrows from the line III—III of FIG. 1.

FIG. 3 shows the manner of mounting one of the work spindles 5 in the column 3 and one of the tail spindles 7 in the column 2. The tail spindle 7 is mounted in a cylindrical sleeve 25 which is installed in and is movable axially with respect to the column 2. The means for changing the axial position of the sleeve 25 in the column 2 comprises a feed screw 23 which meshes with a spindle nut 2A of the column 2 and is rotatable in but moves axially with a bracket 22 secured to the sleeve 25. The right-hand end portion of the feed screw 23 has a polygonal head 23A which can be rotated by a manually operated tool or by a suitable servomotor, not shown. The feed screw 23 is of the self-locking type, i.e., it will automatically hold the sleeve 25 against any unintentional axial movement relative to the column 2. The tail spindle 7 can be moved axially of the sleeve 25 or the center 24 can be moved axially of the tail spindle 7 by a fluid-operated motor having a cylinder 21 connected to the bracket 22 and a piston rod secured to the spindle 7 or center 24.

The work spindle 5 of FIG. 3 has a suitable torque-transmitting device 29 which can engage the adjacent end face of a workpiece 50 and serves to rotate such workpiece in response to rotation of the spindle 5. The transmission 9 for the spindle 5 of FIG. 3 comprises a gear 27 which is coaxial with and rotates the spindle 5, and a second gear 26 which meshes with the gear 27 and is mounted on the output element of the respective prime mover 8. The axial length of the gear 27 exceeds the axial length of the gear 26 (or vice versa) so that these gears remain in mesh when the spindle 5 is shifted in the column 3 axially by a reciprocating device 28, e.g., a hydraulically or pneumatically operated motor whose cylinder is rigid with the case 9A of the transmission 9 and whose piston rod 28A is attached to an arm 5A movable axially with but being unable to share any rotary movements of the spindle 5. The spindles 5 and 7 of FIG. 3 are moved apart while the turret 6 places a workpiece 50 into the space between the torque-transmitting device 29 and center 24. The spindles 5, 7 are thereupon moved toward each other to engage the respective end faces of the workpiece 50 and the corresponding jaws 20 of the turret 6 are caused to open so that the workpiece can rotate as soon as the prime mover 8 of FIG. 3 is started or as soon as a suitable clutch (not shown) between the output element of the prime mover 8 and the spindle 5 is engaged. The prime mover 8 may be mounted directly on the case 9A of the transmission 9 shown in FIG. 3. If desired, the prime mover 8, the transmission 9 and/or the device 28 of FIG. 3 can be mounted, at least in part, in the interior of the column 3.

Each tool spindle 4 can be moved axially in the same way as described for the work spindle 5 of FIG. 3. i.e., by a reciprocating device 28 or the like.

Figure 4:
FIG. 4 is an elevational view of a workpiece.
Figure 5:
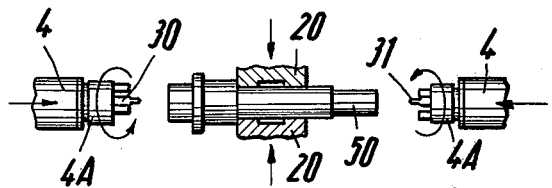
FIG. 5 is a fragmentary partly elevational and partly sectional view of the structure at the first treating station of the machine tool shown in FIG. 1.

The workpiece 50 of FIG. 4 is an elongated rod or shaft which is assumed to necessitate a plurality of treatments including at least one treatment of one or both end faces as well as repeated treatment of its peripheral surface. Such workpiece is inserted between the (open) clamping jaws 20 at the loading-unloading station I of FIG. 2, and the claws 20 are thereupon caused to engage and grip the workpiece for transport to the first treating station II (FIG. 5). The workpiece 50 can be fed to the station I by hand or by a suitable automatic or semiautomatic feeding mechanism of any known design. The turret 6 is thereupon indexed through 72 degrees (clockwise, as viewed in FIG. 2) to move the freshly admitted workpiece 50 into the space between the tool spindles 4 at the first treating station II. The spindles 4 are thereupon moved axially toward each other whereby one or more tools of the respective sets 30, 31 remove material from the adjacent ends of the workpiece. Such tools may include drills, taps or the like. Referring again to FIG. 2, it will be noted that the column 3 is formed with a relatively large cutout 35. A similar cutout is formed in the column 2. The two cutouts are in line with the loading-unloading station I so as to insure that a fresh workpiece 50 can be introduced by moving axially and/or sideways, i.e., in at least three different directions.

The tool spindles 4 at the first treating station II can also serve to center the workpiece 50. To this end, the clamping action of the respective jaws 20 can be slightly relaxed so that the tools of the sets 30, 31 can shift the workpiece 50 axially prior to penetrating into the respective end faces. During treatment by the tools of the sets 30 and 31, the respective jaws 20 hold the workpiece 50 at the station II against rotation with the tool spindles 4.

At the second treating station III (see FIG. 6), the workpiece 50 which has been advanced beyond the station II is engaged by the torque-transmitting device 29 of the respective work spindle 5 and by the center 24 of the respective tail spindle 7. To this end, the spindles 5, 7 are moved axially toward each other in a manner as described above, i.e., by actuating the corresponding reciprocating device 28 and motor 21. The jaws 20 at the station III are moved apart to release the workpiece 50 as soon as the latter is properly engaged and held by the device 29 and center 24. The jaws 20 can be moved apart to the extent which is necessary to allow for unobstructed radial and lengthwise movement of one or more tools 13B or 32 on the copying slide 13. During treatment by the tool 13B, the workpiece 50 at the station III is rotated by the work spindle 5. The tool 13B can remove material from any selected part of the peripheral surface of the workpiece 50, also from such part or parts which are grasped by a pair of jaws 20 during transport of the workpiece from the station II toward the station III.

Figure 6:
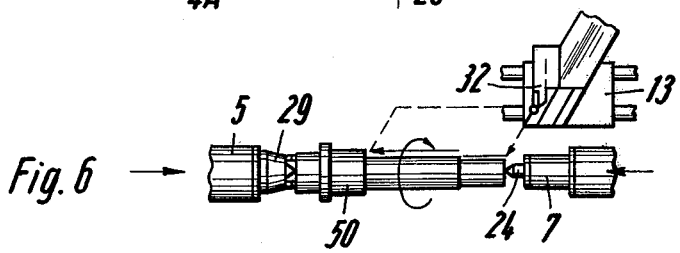
FIG. 6 is a similar view of the structure at the second treating station.
Figure 7:
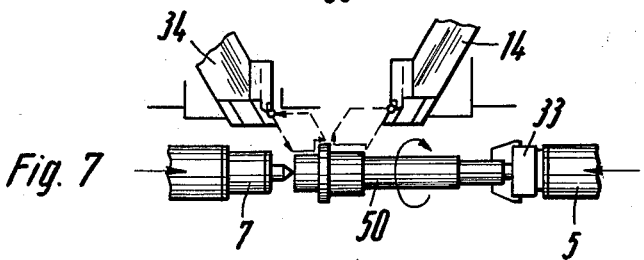
FIG. 7 is a similar view of the structure at the third treating station.

When the treatment of a workpiece 50 at the station III is completed, the motor 8 for the respective work spindle 5 is arrested (or a clutch between the motor and the spindle 5 is disengaged), and the jaws 20 in the adjacent recess 19 of the turret 6 are caused to reengage the workpiece. The spindles 5, 7 at the station III are thereupon moved away from each other so as to allow for unobstructed indexing of the turret 6 which advances the workpiece 50 to the treating station IV. The manner in which the workpiece 50 which reaches the station IV is engaged by the corresponding work spindles 5, 7 (see FIG. 7), released by the corresponding jaws 20 of the turret 6, and set in rotary motion by starting the motor 8 for the respective spindle 5 is the same as described in connection with FIG. 6. At the station IV, the workpiece 50 is treated by one or more tools (such as the tool 14B of FIG. 2) which are movable with respect to the ways 11 of the crosshead 10. The difference between the spindles 5 of FIGS. 6 and 7 is that the spindle 5 of FIG. 7 is provided with a check 33 which grips the adjacent portion of the peripheral surface of the workpiece 50 at the station IV. As shown in FIG. 7, the ways 11 of the crosshead 10 can support two slides 14, 34 whose tools remove material from selected portions of the peripheral surface of the workpiece 50 which is rotated by the check 33 of the spindle 5 at the station IV. The directions in which the tools on the slides 14, 34 move in dependency on the configuration of the respective templates (see the template 16 of FIG. 2 for the tool 14b) are indicated by broken lines.

The spindles 5, 7 at the station IV are thereupon retracted, the workpiece 50 is reengaged by the respective jaws 20, and the turret 6 is indexed to move the workpiece to the station V (see FIG. 8), i.e., between the retracted spindles 5 and 7. The spindles 5, 7 are thereupon moved toward each other, the chuck 33 and the center 24 of FIG. 8 engage the workpiece, and the jaws 20 are opened so that the workpiece 50 at the station V can be rotated by the spindle 5. The rotating workpiece is treated by one or more tools on the slide 17 which is movable lengthwise and/or transversely of the ways 12 on the crosshead 10.

Figure 8:
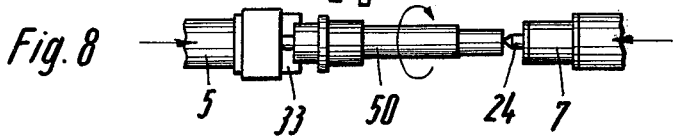
FIG. 8 is a similar view of the structure at the fourth treating station.

The slide 17 is thereupon retracted, the motor for the spindle 5 of FIG. 8 is arrested, the respective jaws 20 reengage the finished workpiece, the spindles 5, 7 are retracted, and the turret 6 is indexed to advance the finished workpiece to the station I. Such workpiece is removed by hand (upon opening of the respective jaws) or by an automatic removing apparatus, not shown.

Figure 9:
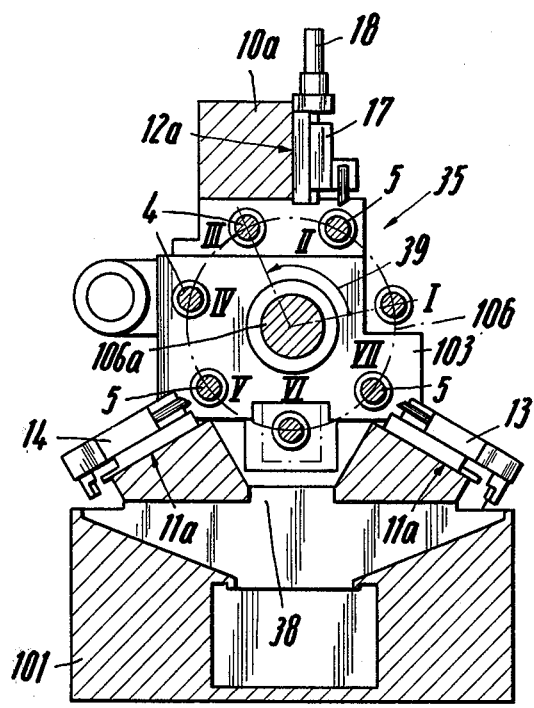
FIG. 9 is a partly diagrammatic transverse vertical sectional view of a second machine tool.

FIG. 9 shows certain details of a modified machine tool which provides a total of seven stations including a loading-unloading station I and six treating stations II–VII. Each of the two columns (only the column 103 shown) carries two tool spindles 4, three work spindles 5, and a work spindle or tail spindle 7. The work spindle 7 on the illustrated column 103 is assumed to be in axial alignment with a spindle 5 on the other column, each of the three tool spindles 7 on the other column is assumed to be in axial alignment with a spindle 5 in the column 103, and each tool spindle 4 on the column 103 is assumed to be aligned with a similar spindle 4 on the other column. The indexible turret is indicated by a phantom-line circle 106. The seven stations of FIG. 9 are equally spaced from each other and the shaft 106a is assumed to index the turret 106 stepwise through angular distances indicated by the arc 39, i.e., a workpiece which is being indexed skips a station on its way to the next position of alignment with a pair of tool spindles or work spindles. Each indexing of the turret 106 through an angle corresponding to two-sevenths of a full revolution results in the transport of a fresh workpiece from the station I to the station III and of a finished workpiece from the station VI to the station I. A complete treatment of a workpiece is assumed to necessitate two complete orbital movements about the axis of the shaft 106a, i.e., from the station I to the station III, thereupon to the station V, thereupon to the station VII, thereupon to the station II, thereupon to the station IV, thereupon to the station VI, and finally back to the station I.

The base or bed 101 is provided with two guide means or ways 11a for tool slides 13, 14 which carry tools for treatment of workpieces at the stations VII and V, i.e., for those stations which are located at a level below the axis of the shaft 106a and which flank a gap 38 through which turnings can fall. The two ways 11a are mirror symmetrical to each other with reference to a vertical plane including the axis of the shaft 106a. The slides 13, 14 can move lengthwise and/or transversely of the respective ways 11a. The relatively wide clearance or gap 38 between the ways 11a allows for substantially unobstructed descent of chips or shavings into a receptacle or onto a conveyor in the lower central portion of the bed 101.

The crosshead 10a of FIG. 9 has elongated ways 12a disposed in a vertical plane and serving to guide one or more tool slides 17 movable by a motor 18 radially of a workpiece at the station II. The reference character 35 denotes the cutout of the column 103 in line with the station I. A similar cutout, in register with the illustrated cutout 35, is provided in the other column.

A fresh workpiece (e.g., an elongated rod or shaft) is fed to the clamping jaws (not shown) at the station I subsequent to each indexing of the turret 106, and a finished workpiece is removed from the jaws at the station I in response to each indexing of the turret.

The improved machine tool is susceptible of many additional modifications. Thus, the number of treating stations can be reduced or increased, certain of the treating stations can be deactivated (i.e., the workpieces can dwell at certain stations without undergoing any treatment), the torque-transmitting and clamping means on the spindles can be interchanged with each other (for example, the chucks 33 can be used interchangeably with the torque-transmitting devices 29 and/or centers 24), and the various carriages and/or slides can be moved from the ways on the crosshead to the ways on the bed or vice versa. Still further, the number of slides on the ways of the crosshead and/or bed can be increased or reduced. For example, the tool slide 17 of FIG. 2 or 9 (which is assumed to carry one or more grooving or similar tools) can be replaced with a slide for (or can support) tools which provide selected portions of successive workpieces with blind or through bores, tapped bores, external threads, or the like.

Still further, the machine tool of FIGS. 1–8 or FIG. 9 can be readily converted for treatment of relatively long or much longer workpieces. Referring to FIG. 1, the column 2 and/or 3 can be mounted on the bed 1 for movement (preferably with the respective spindles) in the directions indicated by double-headed arrows 51. The means for moving the column 3 toward or away from the column 2 (or vice versa) may comprise one or more spindle nuts 52 on the movable column, one or more feed screws 53 on the bed 1, and means (not shown) for rotating the feed screw(s).

It is also within the purview of the invention to provide discrete loading and unloading stations for fresh and finished workpieces, i.e., the overall number of stations may exceed by two the number of treating stations. For example, and referring to FIG. 9, and assuming that each workpiece must be treated at five different stations, the shaft 106a can be intermittently rotated to index the turret through 1/7 of a revolution, the station I is then the loading station for fresh workpieces, the stations II–VI are the treating stations, and the station VII is the unloading station for finished workpieces. The cutouts 35 in the two columns are then preferably enlarged so as to allow for feeding of fresh workpieces and/or removal of finished workpieces in several directions.

An important advantage of the improved machine tool is that it allows for treatment of elongated rod-shaped workpieces by a surprisingly large number of tools in a small area. Thus, each workpiece can be subjected to a substantial number of treatments which include the removal of material from its peripheral surface as well as to a substantial number of treatments at or in the region of one or both end faces. All such treatments can be completed in a single machine tool and without necessitating even temporary removal of partially finished workpieces from the single machine tool. Moreover, and since the jaws 20 can engage those portions of the peripheral surface of a partially finished workpiece which have been treated by one or more tools (refer, for example, to FIGS. 6 and 7 or FIGS. 7 and 8: i.e., the jaws 20 which transport a workpiece 50 from the station III to the station IV or from the station IV to the station V engage such portions of the peripheral surface of the workpiece which have been treated by the tool(s) in the slide 13 or in slides 14, 34), the accuracy of treatment of the workpieces is much more satisfactory than in heretofore known machines wherein the jaws or analogous work clamping means invariably engage untreated portions of the workpieces.

When compared with a conventional machine wherein the spindles are indexible in the frame, the improved machine tool exhibits a host of important advantages including the following: The accuracy of treatment is more satisfactory because the carrier which supports and indexes the spindles of a conventional machine is invariably mounted in the frame with a certain amount of play. Also, the torque-transmitting and work-engaging devices (such as 29, 24, 33) can engage successive tools with a higher degree of reproducibility and accuracy because they need not be indexed from station to station as in a conventional machine. Moreover, such torque-transmitting and work-engaging devices can be made bulkier, heavier and stronger (if necessary) because they need not be indexed relative to the frame. Still further, proper mounting of spindles which need not be indexed presents fewer problems and simplifies the construction and mounting of means which rotates the spindles. Thus, the prime movers 8 and transmissions 9 shown in FIGS. 1 and 3 are much simpler, sturdier and less prone to malfunction than the means for rotating spindles which are indexible with a drum-shaped or otherwise configurated carrier.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims.

We claim:

1. An apparatus for machining elongated workpieces, said apparatus comprising:

a frame having a base and a pair of spaced-apart upright columns extending upwardly from said base;

a workpiece support extending on said frame between said columns and rotatable about a horizontal axis, said support having at least three angularly spaced and outwardly radially opening workpiece seats;

means for indexing said support angularly about its rotation axis between at least three positions in which said seats are aligned with angularly spaced work stations on said frame;

workpiece clamping means in each of said seats including a pair of angularly spaced jaws displaceable anglularly toward each other and defining a radially outwardly opening workpiece-receiving throat, whereby a workpiece can be clamped in each of said seats by the respective pair of jaws with the workpiece extending generally parallel to said rotation axis and having its ends free;

a headstock on one of said columns and a tailstock on the other column together defining a turning axis extending parallel to the support axis in one of said stations;

means for displacing one of said stocks along said turning axis toward and away from the other stock to engage the ends of a workpiece held by a pair of said jaws;

means for rotating said headstock about said turning axis after engagement with a workpiece and release thereof by the respective pair of jaws to turn the workpiece about said turning axis;

a guide extending between said columns parallel to said turning axis in said one station;

a slide displaceable along said guide and carrying a tool engageable with a workpiece spanned between said headstock and tailstock and rotating about said turning axis, whereby said workpiece can be lathed in said one station after release by the respective of said jaws;

a pair of end-machining tools each carried on a respective column and together defining an end-machining axis extending parallel to said rotation axis through another of said stations;

means for displacing each of said end-machining tools along said end-machining axis into and out of engagement with a respective end of a workpiece held between a pair of said jaws in said other station; and means for rotating each of said end-machining tools about said end-machining axis with said end-machining tools in engagement with said ends of the workpiece to machine said ends.

2. A combination as defined in claim 1, wherein said support is a rotary turret and said indexing means includes a shaft supporting said turret and journalled in said columns.

3. A combination as defined in claim 1, further comprising means for moving said slide lengthwise and transversely of said guide.

4. A combination as defined in claim 1, wherein at least one of said columns has a cutout to facilitate the insertion of a workpiece into or the removal of a workpiece from said clamping means in a further said position of said support.

5. A combination as defined in claim 4, wherein each of said columns has a cutout and said cutouts are aligned with each other so as to allow for lengthwise movement of workpieces into or from said clamping means in said further position of said support.

6. A combination as defined in claim 1, wherein said positions of said supporting means are equally spaced from each other, the total number of said positions being an odd number and said indexing means including a device for indexing said supporting means through distances twice that between two neighboring positions.

7. A combination as defined in claim 1, wherein said support is indexible about a substantially horizontal axis and said frame is provided with a plurality of guides including a pair of guides on said main portion at a level below said axis.

8. A combination as defined in claim 7, wherein the guides of said pair are spaced apart from each other and said frame has a gap between the guides of said pair to allow for descent of fragments of material which is removed from a workpiece.

9. A combination as defined in claim 8, wherein the guides of said pair are mirror symmetrical to each other with respect to a vertical plane including said rotation axis.

10. A combination as defined in claim 1, further comprising means for moving at least one of said columns parallel to said axes.

11. A combination as defined in claim 1, wherein said frame further comprises a crosshead remote from said base and extending between and connected to said columns.

12. A combination as defined in claim 11, wherein said guide is provided on said crosshead.

13. A combination as defined in claim 11, wherein said frame is provided with a plurality of guides including a pair of guides on said crosshead.

14. A combination as defined in claim 1, wherein said guide is provided on said base of said frame.

* * * * *